Figure 1:
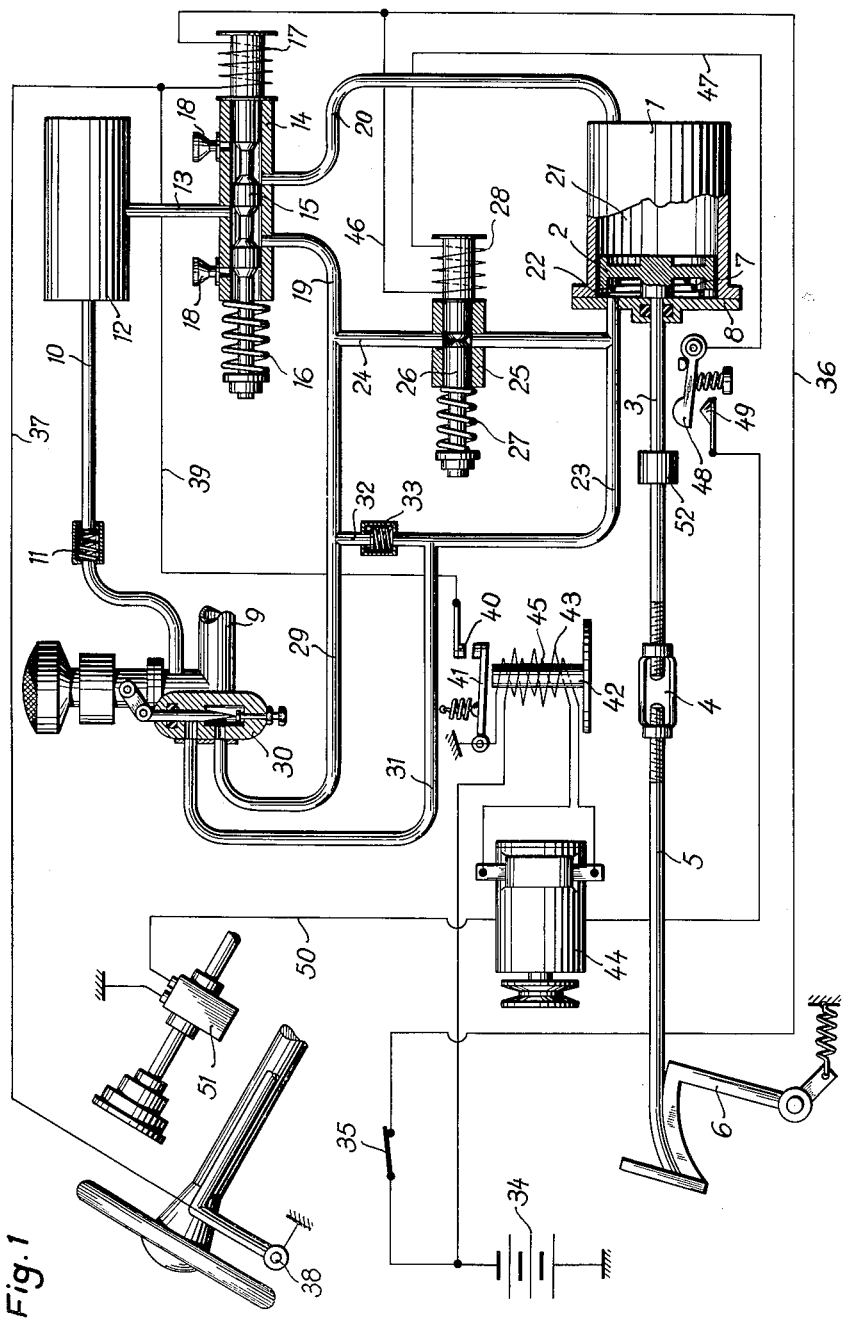

March 21, 1961 J. EDELBLUT 2,975,875
AUTOMATIC CLUTCH DEVICE
Filed June 25, 1957 2 Sheets-Sheet 2
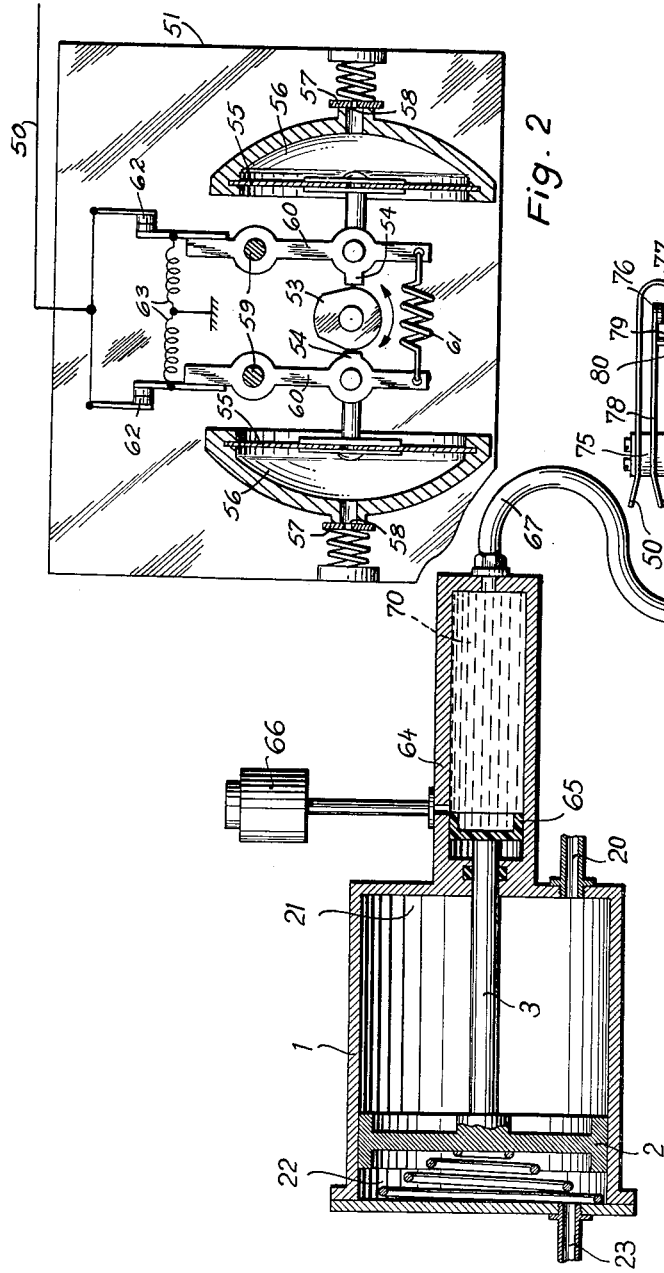
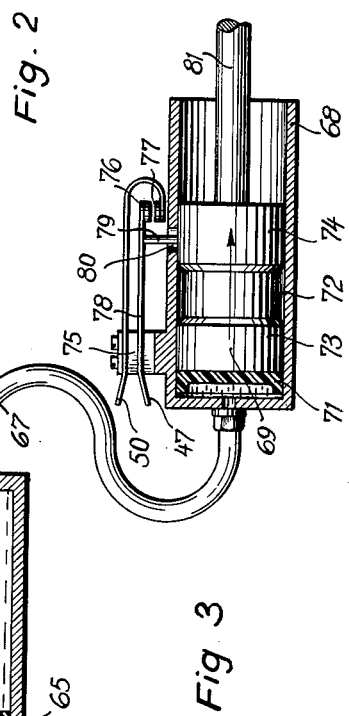

United States Patent Office 2,975,875
Patented Mar. 21, 1961

2,975,875

AUTOMATIC CLUTCH DEVICE

Johann Edelblut, 145 Wilhelmshoherstrasse,
Frankfurt am Main, Germany

Filed June 25, 1957, Ser. No. 667,879

Claims priority, application Germany June 26, 1956

9 Claims. (Cl. 192—3.5)

Automatic clutch devices are known, which are operated by an electromagnet. These devices have the disadvantage that the current consumption is too high for a normal battery and that dependable operation is not insured.

Other automatic clutch devices are known in which a piston contained in a cylinder and connected to the clutch is operated by using the suction of the engine. In this case a normal clutch is used, which is engaged by means of spring force and disengaged by the suction, which overcomes the spring force. In these arrangements the suction is usually insufficient to insure perfect working and rapid coupling.

This invention relates to this last-mentioned type of automatic clutch arrangements, while avoiding their disadvantages by utilizing not only the suction of the engine but also a preferably mechanical force member, for example a spring, a weight, or the like, in such a manner that engagement of the clutch is effected by means of the suction, with simultaneous pre-stressing of the force member, and disengagement of the clutch with the aid of the suction, acting in the opposite direction and supported by the pre-stressed force member.

The force member acts exactly in the opposite way to the springs usually employed in clutches; that is to say, it disengages the clutch. It can without difficulty be so proportioned that in its neutral position it just brings the clutch out of engagement. On engagement of the clutch, the suction acts on one side of the piston and pre-stresses the mechanical force member. On disengagement of the clutch, the said force member promotes rapid disengagement of the clutch, while the further path of the clutch rod can be travelled with the aid of the suction alone. The essential concept accordingly consists in that the suction, always available when the engine is running, is also continuously utilized, that is to say both in the engaged and in the disengaged condition, whereas in known clutches of this type the suction was effective only during disengagement. For this reason the suction for the new arrangement need not be so great.

Another advantage of the arrangement according to the invention is that it can be fitted without difficulty to existing cars of varying sizes.

It is advisable for the induction pipe to be reversed shortly before engagement by the movement of the piston, in such a manner that a reduced suction effect is obtained and hence the clutch is engaged slowly. This procedure is convenient in order that the operation of the arrangement may accurately imitate the slow engagement of the clutch normally practiced by the driver in accordance with his sense of feel.

In order to achieve the above-mentioned effect, use is made of a set of contacts which is operated by a rigid rod system connecting the piston to the clutch or clutch pedal.

This transmission of force, obtained through rigid members, can also be effected with the aid of a hydraulic arrangement. As compared with the above-mentioned rod systems or levers, a hydraulic power transmission system offers the advantage that it has a substantially lower frictional resistance over the entire path. In addition, the hydraulic system permits the installation of the various working elements, such as cylinders with pistons, at any desired point on the motor vehicle.

Slow engagement of the clutch with the aid of a set of contacts can, however, only be obtained when there is a hydraulic connection between the clutch piston and the clutch, if the set of contacts is mounted on the taker cylinder of the hydraulic system or between the taker cylinder and the clutch.

This arrangement insures that the differences occurring in the oil transmission system, and resulting, for example, in a difference in the movement and position allocation of the clutch piston and taker cylinder piston, have no influence on the co-ordination of the contact operation and the corresponding clutch position.

It is further advisable for the set of contacts mounted on the taker cylinder to be provided with a contact spring, which is operated with the aid of a radial pin projecting inwards through the taker cylinder housing and resting on the piston, and further for the piston of the taker cylinder to have a section of smaller diameter between two sections of full diameter of the cylinder.

However, the piston rod of the taker cylinder can also be connected directly to the clutch or clutch fork, whereby the clutch pedal need not also perform the engaging movement in the case of automatic clutch engagement, or the pedal can be completely dispensed with.

It is of course sufficient for the reversal to be effected with the aid of a switch dependent on the speed of travel only when travelling slowly or at rest.

In this connection, a shut-off valve operated in dependence on the speed of travel can be provided in the line in which suction exists during engagement of the clutch and can be bridged over preferably by a reducing valve operable by hand or otherwise.

A reducing valve controlled by a throttle valve is used with particular advantage for reducing the suction. Since the position of the throttle valve is dependent on the position of the accelerator pedal, a larger passage cross-section can be freed in the induction pipe when acceleration is greater, so that the clutch can engage more quickly. This corresponds to the normal method of driving.

In addition, it is advisable to provide a non-return valve, which bridges over the control elements on the piston side which is under suction on the engagement of the clutch, in such a manner that on disengagement of the clutch the air can flow in unhindered on this side. In this way rapid disengagement of the clutch, which is desired in every case, is insured.

In order to operate the clutch, use may be made of a reversing valve, which connects one side of the piston to the suction and the other to the atmosphere and which is preferably operated electromagnetically by the gear shift or selector lever. The construction can be such that an operating knob is provided on the shift lever; the shift lever can however also have a built-in operating switch which closes a contact as soon as the shift lever is moved out of one of its positions of rest.

It is moreover advantageous for the reversing valve to be operated in addition by means of an electric switch when the engine is running slowly or at rest and to disengage the clutch, the said electric switch being controlled by a magnet having a winding energised by the charging current of the dynamo and a winding connected to the voltage of the dynamo. In this way the clutch is automatically disengaged when the engine is at rest or running slowly, that is to say when the car stops or runs to a stop, as is normal driving practice, in order not to stall the engine. The special construction of the switch magnet with one main current and one shunt winding is necessary in order that the respective switch will not be operated by mistake by the return current flowing to the dynamo.

The switch dependent on the speed of travel should effect a reversal of the contacts when a determined low speed, for example 10 or 15 kilometres per hour, is exceeded and, respectively, when the speed drops below that figure. This can for example be a simple tachometer. However, it is advisable to provide a construction having a rotating cam, which can for example be mounted on the tachometer shaft and which co-operates with a plurality of sprung push-rods, which are symmetrically offset in relation to one another and which in turn operate electric contacts connected in parallel in such a manner that when a certain speed is exceeded the contacts are continuously open. The springing of the push-rods is preferably effected by diaphragms closing an air space, while the air space has a non-return valve opening only to the outside and also a small bore. This small bore permits accurate adjustment of the speed of rotation at which the reversal is to be made.

Other features, advantages, and possible fields of application of the invention will be seen from the following description, with reference to the drawings.

Figure 1 shows an operational diagram of an automatic clutch arrangement according to the invention, Figure 2 is a connection and operational diagram of a switch dependent on the speed of travel, and Figure 3 a hydraulic connection diagram for slow engagement of the clutch.

The clutch arrangement has a cylinder 1, in which a piston 2 slides which can be acted on from either side. The piston is connected to a piston rod 3, which is connected through a regulating nut 4 to a connecting rod 5, which in turn leads to the normal clutch pedal 6. A counteracting compression spring 7 is inserted between the piston 2 and one cover 8 of the cylinder 1.

From the induction pipe 9 of the engine, preferably from a point behind the carburetor, a pipe 10 containing a non-return valve 11 is branched off to a vacuum container 12. The latter compensates for fluctuations in the suction, which are dependent on variations of engine speed. From it, a pipe 13 leads to a reversing valve 14, the piston 15 of which is, on the one hand, drawn to the left by a spring 16, and, on the other hand, can be drawn to the right by a magnet coil 17, in order to connect the supply pipe 13 to a pipe 19 and an air aperture 18 to a pipe 20, or conversely to connect the supply pipe 13 to the pipe 20 and an air aperture 18 to the pipe 19. The pipe 20 leads to the side 21 of the piston 2 and, when a vacuum is produced in it, disengages the clutch. The pipe 19 is in communication through a plurality of connecting pipes with a pipe 23 leading to the side 22 of the piston 2, and when vacuum is produced in it engages the clutch.

The main connecting pipe 24 between the two abovementioned pipes 19 and 23 has a shut-off valve 25, the piston 26 of which is drawn by the spring 27 into the open position, and by the action of the magnet coil 28 can be brought into the closed position. The said valve 25 is bridged by a length of pipe, which consists of a pipe 29, a reducing valve 30 controlled by the throttle valve, and a pipe 31. The two valves 25 and 30 are in turn bridged by a non-return valve 33 situated in a pipe 32 and offering no resistance to the entry of atmospheric air to the side 22 of the piston.

The operation of the magnet coil controlling the reversing valve 14 is effected through a circuit which is formed by a battery 34, an ignition switch 35, a line 36, the coil 17, a line 37, and an operating switch 38 on the gear shift or gear selector lever. A line 39, which leads to a contact 40 of a switch 41, is in parallel to the line 37. The switch 41 is operated by an electromagnet 42, which has a winding 43 energised by the charging current of the dynamo 44 and a shunt winding 45 connected to the voltage of the dynamo.

The magnet coil 28 operating the valve 25 lies in a circuit which is formed of the battery 34, the ignition switch 35, the line 36, a line 46, the coil 28, a line 47, a switch 48 with a contact 49, a line 50, and a switch 51 dependent on the speed of travel. A cam ring 52 fastened on the piston rod 3 operates the switch 48 as soon as the piston has attained a determined central position in the region of which coupling is effected.

The mode of operation of this automatic clutch arrangement is as follows:

For the purpose of disengaging the clutch at normal speed of travel, the switch knob 38 is operated, whereby the coil 17 is excited and pulls the reversing piston 15 to the right. Suction is thereby applied to the side 21 of the piston, while the side 22 is connected to the atmosphere. In consequence of the support given by the force of the counteracting compression spring 7, the piston 2 rapidly moves to the middle position and is then moved further to the right by the suction force alone. Disengagement of the clutch therefore takes place very quickly.

Engagement of the clutch during normal travel is effected by disconnecting the electrical connection in the switchbutton 38, so that the reversing piston 15 moves back to the left. The side 21 of the piston is then connected to the atmosphere, while the side 22 is exposed to the action of suction. Since the valve 25 is fully open, the vacuum works with full force, so that the piston moves relatively quickly to the left and engagement of the clutch is completed. The operation of the switch 48, which has in the meantime been effected by the annular cam 52, is without effect, since the switch 51 dependent on the speed of travel has disconnected the connection to ground.

Disengagement of the clutch when travelling slowly does not differ from disengagement when travelling fast.

Engagement of the clutch when travelling slowly on the other hand should be effected in such a manner that the engaging movement takes place slowly. If therefore the coil 17 of the reversing switch 14 is without power, the full vacuum first acts on the side 22 of the piston 2. The latter therefore moves with relatively high speed to the left, until the cam ring 52 has depressed the switch 48. Since, when the vehicle is travelling at a low speed the switch 51, which is dependent on the speed of travel, has made the connection to ground, the coil 28 of the valve 25 is excited, so that this valve closes. The suction accordingly passes to the side 22 of the piston only through the reducing valve 30, which reduces the cross-section. The piston accordingly moved to the left at a correspondingly lower speed. Only when the cam 52 releases the switch 48 again, can the piston travel the remainder of its path to the left at a high speed again. There is no difficulty in so adjusting the cam 52 that the operation of the switch 48 takes place precisely at the moment when the pressure point of the clutch is reached, that is to say when the clutch disc begins to rotate with the pressure plate of the clutch.

When stopping, or whenever the engine is running only slowly, the clutch must be disengaged in order not to stall the engine. This is achieved by the fact that as soon as the charging current of the dynamo becomes too weak, the switch 41 closes the contact 40, whereby the coil 17 is excited and disengagement of the clutch is effected automatically.

Certain modifications of this arrangement can of course be conceived. For example the reducing valve 30 controlled by the throttle flap can be replaced by a hand-operated regulatable member. The reducing opening can also be incorporated into the valve 25. In addition, it is possible to operate the reversing device which gives a reduced suction adjustment mechanically instead of electromagnetically, for example, by providing the piston rod with corresponding bores, which are overtravelled at a suitable point and thus effect the reduction of pressure.

A tachometer may for example be used as the switch 51 dependent on the speed of travel, although such appliances work with relative inaccuracy in the lower speed range. An apparatus of the type illustrated in Figure 2 can be used with particular advantage.

On the shaft, preferably the tachometer shaft, there is mounted a cam disc 53, which alternately presses outwards the two push-rods 54, which are offset 180° in relation to one another. These push-rods are connected to resilient diaphragms 55, which in turn cover an air space 56, which is closed by a non-return valve 57, in which a small bore 58 is provided. The push-rods 54 are connected to levers 60 which are mounted on pivots 59 and are held together at their opposite end by a spring 61. When the levers are moved outwards, switches 62 connected to them are opened, these switches being connected on the one hand through movable lines 63 to ground and on the other hand in parallel with the line 50.

The mode of operation of this arrangement is as follows: with a high speed of rotation of the cam 53, the push-rods 54 are pressed outwards, while the air is displaced from the air space 56 through the non-return valve 57. The push-rods can return to their position of rest only slowly, as air can flow into the air space 56 only slowly through the bore 58. At high speed, therefore, the push-rods 54 are held continuously pressed outwards and the contacts 62 are continuously open.

At low speed of rotation, on the other hand, the push-rods have an opportunity to return to their position of rest during each rotation, so that one of the contacts 62 is always closed. By suitable selection of the size of the bore 58, the desired speed of rotation of the cam or speed of travel of the vehicle at which the switching operation is to take place can be accurately adjusted. In the region of the limit speed of rotation the parallel connection consisting of the two contacts 62 is only intermittently closed, so that current impulses are allowed through. These impulses effect a weaker excitation of the coil 28 of the valve 25, so that in this speed range the piston 26 of this valve assumes an intermediate position, which likewise produces a certain reduction of the suction action.

The switch arrangement illustrated, which is dependent on the speed of rotation, can easily be modified. For example, instead of the diaphragms a piston system or else a frictional system can be used.

Figure 3 again shows the clutch cylinder 1, in which a piston 2 acted on from both sides is adapted to slide. Since, on disengagement of the clutch, a pressure is to be applied through the hydraulic arrangement, the piston rod 3 is taken out at the end 21 of the clutch cylinder. A transmitter cylinder 64 is attached to the cylinder 1. The piston rod 3 has at its end another piston 65, which slides in the transmitter cylinder 64 and moves the pressure liquid. To make up leakage losses pressure liquid is supplied through a storage tank 66. The transmitter cylinder 64 is connected by a hose 67 to the receiver cylinder 68. In the receiver cylinder 68 is provided a piston 69 which on disengagement of the clutch is moved in the direction of the arrow by the pressure liquid 70, through a special packing 71. The piston 69 has a constriction 72, which has a smaller diameter than the other two portions 73 and 74. On the outside of the cylinder 68 is mounted a set of contacts 75 with the two contacts 76 and 77 and the contact spring 78. The contact 76 is connected to the line 47 and the contact 77 to the line 30. On the contact spring 78 a pin 79 is fastened which in turn co-operates with the piston 69 of the receiver cylinder 68. The receiver cylinder 68 has an aperture 80 through which the pin 79 projects, to rest on the piston 69. The piston rod 81 fastened to the piston 69 is connected directly (not illustrated) to the clutch.

When the clutch is in the engaged position, as illustrated, the contacts 76, 77 are open and the pin 79 rests on the piston portion 74.

On disengagement of the clutch, the piston 2 and consequently the piston 69 is moved to the right, in accordance with the stroke of the piston 2. The contacts 76, 77 are then, it is true, closed as the constriction 72 moves past the pin 79, but this has no effect on the control of the suction in the pipe 23, since atmospheric pressure prevails in that pipe at the moment in question, and air can enter through a non-return valve. In the end position of the piston 69, the contacts 76, 77 are again opened.

On engagement of the clutch, the piston 69 is moved in the direction opposite to that of the arrow shown. As the constriction 72 moves past the pin 79, the contacts are closed, whereby the circuit to a magnet is closed, which effects a reversal in the suction pipe 23 in such a manner that the piston 2 can then move only slowly, so that the desired slow engagement of the clutch is ensured. When the piston 69 has been moved so far that the portion 74 again raises the pin 79, whereby the contacts are opened again, the magnet is deprived of current and the piston 2 can move rapidly in the direction of the clutch engagement position.

The contact set 75 can also be disposed between the receiver cylinder and the clutch, being operated for example by a sleeve provided on the piston rod 81. The piston 69 could correspondingly then also have a different shape, for example one corresponding to the piston 2.

I claim:

1. An automatic arrangement for a clutch in a vehicle comprising a cylinder, a piston in said cylinder and connected to the clutch, a first suction pipe operatively coupled to one side of the piston for disengagement of the clutch, a second suction pipe operatively coupled to the other side of the piston for engagement of the clutch, suction means, reversing valve means selectively coupling one of the suction pipes to said suction means and the other of said suction pipes to atmosphere, a mechanical member operatively associated with the clutch and which stores energy during the engagement of the clutch for augmenting disengagement of the clutch, a cut-off valve in the second suction pipe, a pressure-reduction device bridging said cut-off valve, said pressure-reduction device being selectively operable to reduce the suction in said second suction pipe to decrease rate of engagement, and an electric circuit means for controlling the cut-off valve to render said cut-off valve and said pressure-reduction device selectively active to connect the second suction pipe to said suction means, said circuit means comprising and being controlled by a first switch operable in accordance with the speed of the vehicle and a second switch operatively associated with the piston and actuatable in accordance with the engagement of the clutch whereby the speed of piston movement is controlled.

2. A clutch arrangement according to claim 1, comprising throttle means controlling the reduction device.

3. A clutch arrangement according to claim 1, comprising a second duct bridging the cut-off valve and a non-return valve in said second duct and opening toward the cylinder.

4. A clutch arrangement for a vehicle having a gear control and according to claim 1, wherein the reversing valve means is coupled to and operated by the gear control.

5. A clutch arrangement according to claim 4, comprising an electric switch means coupled to and operating the reversing valve means, a magnet including an actuating coil, and a dynamo operated in accordance with vehicle speed and coupled to said coil for operating the electric switch.

6. A clutch arrangement according to claim 1, wherein the first switch comprises a rotating cam, a plurality of loaded push-rods symmetrically offset in relation to one another and operatively associated with the cam, and electric contacts operated by the push-rods whereby, when a predetermined cam speed is exceeded, the contacts are continually open.

7. A clutch arrangement according to claim 6, comprising means effecting the loading of the push-rods and comprising diaphragms each defining an air space, and a non-return valve opening only from the air space to the atmosphere and defining a bore for the charging of the air space.

8. A clutch arrangement according to claim 1, comprising a hydraulic system coupling said piston and clutch and including a taker cylinder and piston, being operatively associated with the taker cylinder and piston for operation thereby.

9. A clutch arrangement according to claim 8, comprising contacts on the taker cylinder and a contact spring, and a pin supporting the contact spring and projecting radially through the taker cylinder and resting on the taker piston, the taker piston having a portion of first diameter and two portions of greater diameter for controlling said pin.

References Cited in the file of this patent

UNITED STATES PATENTS

| | | |
|---|---|---|
| 2,057,491 | Joseph | Oct. 13, 1936 |
| 2,073,214 | Lohse | Mar. 9, 1937 |
| 2,095,763 | Price | Oct. 12, 1937 |
| 2,511,373 | Price | June 13, 1950 |
| 2,605,872 | Prather | Aug. 5, 1952 |
| 2,688,388 | Gill | Sept. 7, 1954 |
| 2,760,610 | Prachar | Aug. 28, 1956 |
| 2,763,347 | Hanbourdin et al. | Sept. 18, 1956 |